US011338630B2

(12) United States Patent
Salt

(10) Patent No.: US 11,338,630 B2
(45) Date of Patent: May 24, 2022

(54) METHOD AND SYSTEM FOR MEASURING DEFORMATION OF A SURFACE

(71) Applicant: PAVEMENT ANALYTICS LIMITED, Dunedin (NZ)

(72) Inventor: Graham Alexander Salt, Dunedin (NZ)

(73) Assignee: PAVEMENT ANALYTICS LIMITED, Dunedin (NZ)

( * ) Notice: Subject to any disclaimer, the term of this patent is extended or adjusted under 35 U.S.C. 154(b) by 387 days.

(21) Appl. No.: 15/781,219

(22) PCT Filed: Dec. 2, 2016

(86) PCT No.: PCT/NZ2016/050191
§ 371 (c)(1),
(2) Date: Jun. 4, 2018

(87) PCT Pub. No.: WO2017/095239
PCT Pub. Date: Jun. 8, 2017

(65) Prior Publication Data
US 2020/0171893 A1     Jun. 4, 2020

(30) Foreign Application Priority Data

Dec. 4, 2015 (NZ) .......................................... 714896
May 18, 2016 (NZ) .......................................... 720276

(51) Int. Cl.
*B60C 23/06* (2006.01)
*B60C 23/04* (2006.01)
(Continued)

(52) U.S. Cl.
CPC ........ *B60C 23/064* (2013.01); *B60C 23/0488* (2013.01); *G01M 5/0066* (2013.01); *B60C 2019/004* (2013.01)

(58) Field of Classification Search
CPC .............. B60C 23/064; B60C 23/0488; B60C 2019/004; G01M 5/0066
(Continued)

(56) References Cited

U.S. PATENT DOCUMENTS 3,427,877 A * 2/1969 Carpenter ................ G01N 3/34
73/146
3,481,183 A * 12/1969 Swift ...................... G01M 7/00
73/573
(Continued)

FOREIGN PATENT DOCUMENTS

CN      102337721 A   *   2/2012
JP      2002340863 A  *  11/2002
(Continued)

OTHER PUBLICATIONS

International Preliminary Report on Patentability for International Application No. PCT/NZ2016/050191 dated Jun. 5, 2018 (6 pages).
(Continued)

*Primary Examiner* — Marrit Eyassu
(74) *Attorney, Agent, or Firm* — Merchant & Gould P.C.

(57) ABSTRACT

Deformation of a surface, such as a pavement surface is measured using a rolling weight or wheel carrying one or more accelerometers positioned to measure the deformation occurring at a point on or near the perimeter of the wheel. The weight is rolled over the surface to be measured. The signals developed by the one or more accelerometers during a stationary cycloidal period of the point on the perimeter of the wheel are analysed to provide a measure of surface deformation based on the one or more signals.

24 Claims, 8 Drawing Sheets

(51) Int. Cl.
G01M 5/00 (2006.01)
B60C 19/00 (2006.01)

(58) Field of Classification Search
USPC .......................................................... 73/146
See application file for complete search history.

(56) References Cited

U.S. PATENT DOCUMENTS

| | | | | |
|---|---|---|---|---|
| RE27,875 E | * | 1/1974 | Swift | G01M 7/00 |
| | | | | 73/573 |
| 5,056,354 A | * | 10/1991 | Kuwana | B60T 8/1764 |
| | | | | 73/146 |
| 5,614,670 A | * | 3/1997 | Nazarian | E01C 23/00 |
| | | | | 73/146 |
| 6,065,904 A | * | 5/2000 | Cook | E01C 19/235 |
| | | | | 405/303 |
| 2003/0005759 A1 | * | 1/2003 | Breed | G08G 1/096758 |
| | | | | 73/146 |
| 2003/0058118 A1 | * | 3/2003 | Wilson | B60C 23/0488 |
| | | | | 340/679 |
| 2005/0097949 A1 | * | 5/2005 | Hillenmayer | B60C 23/0488 |
| | | | | 73/146 |
| 2008/0243334 A1 | * | 10/2008 | Bujak | B60G 17/018 |
| | | | | 701/37 |
| 2009/0210111 A1 | * | 8/2009 | Laermer | B60T 8/1725 |
| | | | | 701/29.5 |
| 2010/0271191 A1 | * | 10/2010 | de Graff | B60C 23/0408 |
| | | | | 340/447 |
| 2014/0070935 A1 | * | 3/2014 | Wang | B60C 23/0494 |
| | | | | 340/443 |
| 2014/0343797 A1 | * | 11/2014 | Naito | B60C 23/064 |
| | | | | 701/45 |
| 2015/0191056 A1 | * | 7/2015 | Mori | B60C 23/0488 |
| | | | | 73/146.5 |
| 2015/0362414 A1 | * | 12/2015 | Stoeckel | E02D 3/026 |
| | | | | 404/128 |
| 2019/0154440 A1 | * | 5/2019 | Theunissen | G01P 15/0891 |

FOREIGN PATENT DOCUMENTS

| | | |
|---|---|---|
| WO | 02092364 A2 | 11/2002 |
| WO | 2002092364 A2 | 11/2002 |
| WO | 2010073272 A1 | 7/2010 |
| WO | 2012085649 A1 | 6/2012 |
| WO | 2015019288 A1 | 2/2015 |

OTHER PUBLICATIONS

International Search Report for International Application No. PCT/NZ2016/050191 dated Mar. 17, 2017 (4 pages).

International Written Opinion for International Application No. PCT/NZ2016/050191 dated Mar. 17, 2017 (5 pages).

Savaresi et al. "New Regressors for the Direct Identification of Tire Deformation in Road Vehicles Via "In-Tire" Accelerometers." IEEE Transactions on Control Systems Tech. vol. 16, No. 4 (Jul. 2008), p. 769-780.

Jimenez et al. "A Comparison of Pedestrian Dead-Reckoning Algorithms using a Low-Cost MEMS IMU." 6th IEEE International Symposium on Intelligent Signal Processing. (Aug. 2009), p. 37-42.

Fraggstedt. "Vibrations, damping and power dissipation in Car Tyres." KTH Engineering Sciences, Royal Institute of Technology, Doctoral thesis. (2008), p. 1-38.

European Search Report for EP Application No. 16871118.2 dated Apr. 2, 2019 (8 pages).

Bay et al. "Developement of a rolling dynamic deflectometer for continuous deflection testing of pavements." (May 1998) Center for Transportation Research: Bureau of Engineering Research—The University of Texas at Austin (252 pages).

Lee et al. "The Rolling Dynamic Deflectormeter: A tool for continuous deflection profiling of pavements." Proceedings of the 16th International Conf. on Soil Mechanics and Geotechnical Engineering. Millpress Science Publishers (2005-2006) pp. 1745-1748.

* cited by examiner

METHOD AND SYSTEM FOR MEASURING DEFORMATION OF A SURFACE

This application is a National Stage Application of PCT/NZ2016/050191, filed 2 Dec. 2016, which claims benefit of Serial No. 714896, filed 4 Dec. 2018 and Serial No. 720276, filed 18 May 2016 in New Zealand and which applications are incorporated herein by reference. To the extent appropriate, a claim of priority is made to each of the above disclosed applications.

FIELD OF INVENTION

The present invention relates to determination of one or more structural parameters of a surface.

BACKGROUND TO THE INVENTION

Load bearing capability is a fundamental property that requires quantification for all types of pavement structures. This encompasses roads (both local and state highways), airport runways, heavy duty pavements and in many earthfills and hardfills where adequate compaction and strength are important. Pavement structural capacity may deteriorate, over time, owing to a number of factors, including changes in the elastic moduli of sub-pavement layers of bound layers, aggregates or earth. In order to determine pavement condition, the load bearing capability of the pavement can be periodically tested to quantify its structural condition. It is desirable to utilise technologies that are non-destructive so that the integrity of the pavement surface is maintained. Further, the measurements should desirably be made rapidly or at least at customary traffic speed, through an automated system, to minimize time, avoid impediments or risk to road users and reduce costs.

Deflectometers measure the deflection of a surface (such as a road or pavement) under a given force and use this deflection either to calculate some strength or stiffness parameter (e.g. the elasticity modulus) or to use the deflection as a direct empirical measure of the strength and stiffness.

Different methods have been developed for the non-destructive testing of pavements, with one utilizing a falling weight dropped on a plate on the pavement from a stationary platform. A row of stationary geophones (velocity sensors) placed on the road and extending horizontally in the direction of travel from the centre of the load plate then measure the deflection of the pavement at intervals out from the falling weight. Systems utilizing this method are commonly referred to as falling weight deflectometers (FWD or FWDs). Measurement is performed when the testing equipment is stopped, ie no movement in the direction of vehicle travel. As this is a static test it is very slow when acquiring a number of measurements.

In the 1950s the Benkelman Beam, with manual measurement of deflection allowed up to 300 measurements per day with a skilled crew.

The Lacroix and California Traveling Deflectograph were based on the Benkleman Beam and utilise probes placed on the road surface to measure the deflection from a constantly moving lorry. These devices are limited to a maximum speed of about 7 kmph.

The French Curviamètre utilises Geophones mounted on a continuous closed-loop track passing between two wheels (i.e. the wheels do not drive on the chain) with the chain travelling on the pavement surface between dual rear wheels. Measurements are taken when the chain approaches and passes between the two rear wheels. The fifteen meters long closed-loop chain is equipped with three geophones generating a result every five meters. This design was limited to a top speed of about 20 kmph. With this device the track passes in the space between dual wheels, not beneath a loaded tyre, nor does this device test at highway speed.

Other slow speed devices are used during compaction of soil or granular layers and use the vibration frequencies of a steel wheeled compactor to measure the change in stiffness and degree of compaction, during the compaction process. The vibration frequencies and amplitude in relation to the roller forward movement speed are examined and used to optimise the compaction process and are not applied to structural analysis of pavement life.

Due to the speed limitations of these devices laser based systems were developed.

TSD or Traffic Speed Deflectometer, traditionally using laser velocity measurement from a horizontal beam on the test vehicle, measures pavement vertical velocity with a row of sensors extending horizontally in the direction of travel from the centre of loaded dual wheels. It is carried out while the testing equipment is intended to be travelling at traffic speed, but in practice is usually limited to well below 100 kmph.

RWD or Rolling Weight Deflectometer, traditionally using laser distance measurement from a horizontal beam on test vehicle, to measure pavement deflection between loaded dual wheels with a row of sensors extending horizontally in the direction of travel. It is intended to be carried out while the testing equipment is travelling at traffic speed.

The Purdue Deflectograph includes at least four non-contact laser range finders mounted in a line along the vehicle. A geometric relationship is then used to calculate the deflection. High Speed Deflectographs use laser Doppler velocity-meters rather than the "standard" laser triangulation distance-meters. These devices are, however, complex and capital cost is expensive.

The TSD and RWD systems utilise a fast moving, heavy dual wheel load that rolls along the pavement, with sensors being arranged at intervals out from between the centre of the dual wheels to measure deflection. A device of this type is disclosed in U.S. Pat. No. 4,571,695. In essence, a load is placed on a dual wheel assembly that rolls along the pavement and the depth of a deflection basin created by the loaded dual wheels is measured using precision laser sensors mounted on a horizontal member that tracks with the dual wheel. Such deflection measurements provide insight into the load bearing capability of the pavement. However, pavement deflections are usually very small, typically 0.010 to 0.100 inch for a 20,000 pound applied axle load. Therefore, not only are extremely sensitive sensors required to measure the deflection, but the sensors should have a stable reference plane.

Correlations and/or use of elastic theory are also required because pavement acceleration (or velocity or deflection) alone provides limited information regarding the bearing capacity of a pavement. In the mechanistic-empirical method of pavement design, the permissible number of load applications, to cause a certain level of damage to the pavement structure, is determined from the critical stresses or strains in the pavement layers. The rates at which rutting or roughness of a pavement progresses are normally related to the vertical compressive strain at the top of the subgrade, and cracking to the horizontal tensile strain at the bottom of a cement- or bitumen-bound layer.

It is an object of the present invention to provide a dynamic deflectometer and method of measurement overcoming at least some of the problems encountered in the prior art or to at least provide the public with a useful choice.

SUMMARY OF THE INVENTION

The traditional approach of rolling weight deflectometers and the Curviamètre is to use a rolling dual wheel load to measure the response of a surface as the load approaches, ie the peak deflection under the footprint of either of the wheels, being not visible, cannot be measured. With the manual Benkelman Beam method, deflection measurements are taken as the dual wheel moves away and again the peak deflections under either of the wheels cannot be measured. None of these devices measures the maximum deflection of the pavement at the point directly below any of the tyres. Normal expectation would be that centrifugal forces and noise from road-tyre interaction would be too high for useful measurement to be made at normal driving speeds.

After several years of experiment it was discovered that the output of an accelerometer positioned so that it measures the deformation of a point located on or near the wheel perimeter at cycloid stationary periods (i.e. when the point to be measured is pressed against the pavement surface beneath a loaded wheel at the point of maximum deformation) has surprisingly low noise and when appropriately positioned, provides an accurate correlation with pavement structural parameters including surface deformation. Accuracy diminishes at very high speeds, but useful information is still recorded well over the maximum speed limit for the TSD operation. The Applicant's arrangement may be referred to as a Dynamic Screening Deflectometer (DSD).

The accelerometer signal may be integrated with respect to time to determine additional parameters including velocity and displacement of the pavement. Differentiating with time determines "jolt". The advantage now is the compact size and low cost of sensors. Accelerometers are also available as force-balanced seismometers or in a composite form (inertial measurement unit or IMU), some with capacity to measure magnetic orientation and rotational motion (angular velocity). Linear velocity in this application can be integrated from acceleration or measured directly. Note, because the majority of the useable information for the intended purpose is acceleration, the terms accelerometer and acceleration are used below, but they are used herein to denote each of the characteristics detected by one or more IMUS (or calculated from their measurements) and including acceleration, linear velocity, angular velocity, jolt and magnetic orientation, about any or all three dimensions, measured individually or in any combination, in the situations and for the purpose described below.

The present invention relates to determination of one or more structural parameters of a surface, particularly, although not exclusively, the invention relates to non-destructive testing of pavements and in particular to methods and apparatus for determination of pavement structural parameters including e.g. one or more of deflection, curvature and stiffness of pavements as well as direct correlations with distress severity. The testing can be carried out at either fast or slow speeds using a rolling weight or wheel(s).

According to a first aspect there is provided a method of measuring deformation of a surface comprising:
 a. providing an accelerometer positioned to measure deformation at or near the periphery of a rolling weight;
 b. rolling the rolling weight over the surface;
 c. analysing one or more signals developed by the accelerometer during a stationary cycloidal period of the accelerometer; and
 d. developing a measure of surface deformation based on the one or more signals.

According to a further aspect there is provided a method of measuring deformation of a surface comprising:
 a. providing an accelerometer positioned to measure deformation proximate to the surface;
 b. applying a downward force to the surface whilst the accelerometer is maintained in substantially fixed relationship to the surface;
 c. analysing one or more signals developed by the accelerometer; and
 d. developing a measure of surface deformation based on the one or more signals.

According to a further aspect there is provided a system for measuring the deformation of a surface including:
 a. a rolling weight;
 b. an accelerometer or accelerometers positioned to measure deformation at or near the periphery of the rolling weight; and
 c. a signal analysis circuit which:
   i. receives signals from the accelerometer;
   ii. analyses the signals to identify stationary cycloid periods;
   iii. extracts acceleration information for the identified stationary periods; and
   iv. develops one or more measures of surface deformation based on the extracted acceleration information.

According to a further aspect there is provided a system for measuring the deformation of a surface including:
 a. a rolling weight;
 b. an accelerometer positioned to measure deformation at or near the periphery of the rolling weight; and
 c. a signal analysis circuit which:
   i. receives signals from the accelerometer;
   ii. identifies stationary cycloid periods based on user input;
   iii. extracts acceleration information for the identified stationary periods; and
   iv. develops one or more measure of surface deformation based on the extracted acceleration information.

According to a further aspect there is provided a system for measuring the deformation of a surface including:
 a. an accelerometer positioned to measure deformation proximate to the surface for direct force transmission from the surface;
 b. a rolling weight for applying a downward force to the surface; and
 c. a signal analysis circuit which:
   i. receives signals from the accelerometer;
   ii. analyses signals during periods of application of downward force; and
   iii. develops one or more measure of surface deformation based on the extracted acceleration information.

According to a further aspect there is provided a tyre belt or mesh adapted to fit to the tyre of a vehicle for measuring the deformation of a surface comprising a belt adapted to be fitted about a vehicle tyre having one or more acceleration sensors positioned to measure deformation at or near the periphery of the belt.

According to a further aspect there is provided a tyre for measuring the deformation of a surface including one or more accelerometers positioned to measure deformation at or near the periphery of the tyre.

BRIEF DESCRIPTION OF THE DRAWINGS

The invention will now be described by way of example with reference to the accompanying drawings in which.

DETAILED DESCRIPTION OF PREFERRED EMBODIMENTS

Figure 1A:
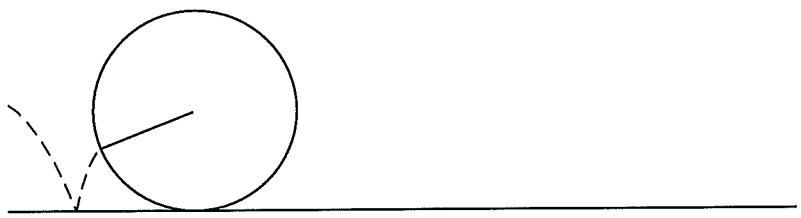
FIGS. 1A to 1C illustrate a trajectory defined by a device mounted at or near the periphery of a rolling wheel.

In one aspect the present invention involves positioning one or more accelerometers at or near the perimeter of a heavily loaded rolling wheel and/or nearby rolling wheels to make possible the utilisation of the stationary period in cycloid movement when the rugged sensor housing of an accelerometer becomes pressed against the road surface. The sensor may measure and record the acceleration versus time history of motion from which pavement displacement, velocity, acceleration, rate of change of acceleration (jolt) and/or the "signature" shape of part of the record is used to determine pavement structural parameters for asset management, design or construction quality assurance. The sensor may alternatively be located some distance in from the perimeter of the wheel but rigidly connected in a manner that it will record the deformation of the perimeter. For example, the accelerometer may be mounted with a rigid connection to the measuring pad which is pressed against the road.

This information may then utilised to determine more than acceleration and according to the present invention may be utilised to determine deflections or curvature of the pavement surface as well as critical strain parameters that can be applied to predict bearing capacity, deformation, potential for cracking, rutting progression, roughness progression and associated characteristics of pavements. This approach enhances the value of pavement testing while at the same time allowing for testing systems having both slow, medium or fast moving wheel loads. The collected data from multiple wheels of different configurations can be used to determine pavement life, vertical compressive strain, shear strain and horizontal tensile strain, which can be more valuable for the prediction of remaining pavement life and design recommendations for repair and maintenance.

Instead of a simple accelerometer or seismometer, an inertial measurement unit (IMU) may be employed. An IMU is an electronic device that measures and reports a body's specific force, angular rate, and sometimes the magnetic field surrounding the body, using a combination of accelerometers and gyroscopes, and sometimes also magnetometers. IMUs often contain three accelerometers and three gyroscopes and optionally three magnetometers. The accelerometers are commonly placed such that their three measuring axes are orthogonal to each other. They measure inertial acceleration, also known as G-forces. Three gyroscopes may be placed in a similar orthogonal arrangement, measuring rate of rotation in reference to an arbitrarily chosen coordinate system. Three magnetometers may also be included to allow better performance for dynamic orientation calculation Where an IMU is employed multiple characteristics of the sensors may be used to quantify desired parameters and address instrument noise and drift. As well as acceleration, velocity may be used to determine the change in deflection over the stationary period, angular velocity over the stationary period may be used to determine directly, the curvature of the deformed shape of the pavement deflection bowl, which in itself is a widely used empirical parameter for design of asphaltic pavements. Detecting the earth's magnetic field may be used for orientation, including identification of any localised deviation of the vehicle path from a straight line so that anomalous readings that occur simultaneously can be corrected in the quality assurance process.

A horizontal pressure wave due to forward motion of the wheel as the wheel approaches a surface, followed by its reversal as it goes away from it, is a deformation characteristic that the invention may utilise, either in conjunction with or independent from, readings from other sensors on the heavily loaded wheel or nearby wheels, to determine the stiffness properties of the pavement, which are then used for remaining life and rehabilitation requirements.

Figure 1B:
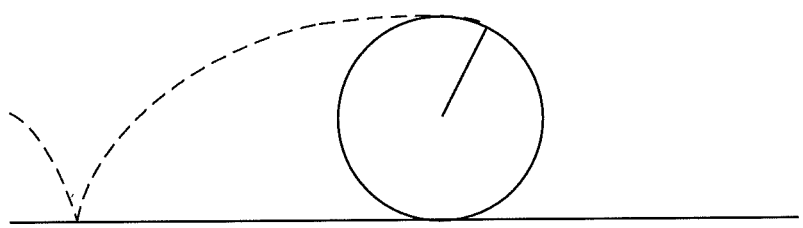
Figure 1C:
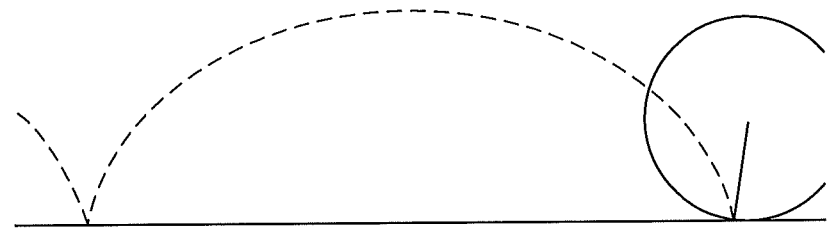

Fundamental Concept: Intuitively many would expect the perimeter of a rolling wheel would be subject to very large accelerations from centrifugal forces, so any small acceleration of the pavement itself would be indistinguishable and attempts to construct a device that would be practical, would be futile. This is not the case, as explained below with reference to FIGS. 1A to 1C.

The dashed trajectory defines the locus of the accelerometer position on the perimeter of the wheel and the cusp that meets the solid line (road surface) defines the stationary period of the sensor, when it has zero horizontal velocity, irrespective of the velocity of the centre of the wheel (assuming the pavement is rigid). At the stationary period, any acceleration measured in either the horizontal direction of travel or vertical direction relates proportionately to the amount of deformation occurring within the pavement during passage of the known wheel load. Because all road surfaces and wheels are not infinitely stiff, the compression of either will extend the stationary period from instantaneous to several milliseconds or longer and this duration can be controlled with wheel materials (or tyre pressures). Correlation of those accelerations with the state of trafficked pavements, measured deflections or velocities under traditional devices (such as Beam, Deflectograph, FWD RWD or TSD) enables rapid and reliable assessment of pavement structural capacity.

Figure 2:
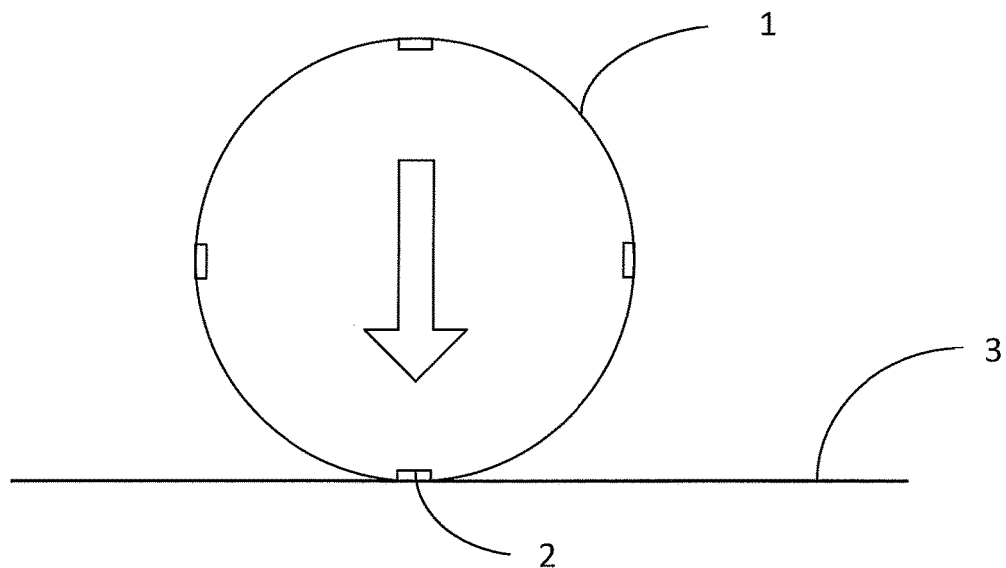
FIG. 2 shows a rolling weight having a plurality of accelerometers distributed about its periphery.

Referring to FIG. 2 a rolling weight in the form of a wheel 1 has four accelerometers 2 housed in ruggedised housings positioned about (at or near) its periphery. It will be appreciated that where an accelerometer is described below that an IMU may be substituted. In this example the accelerometer housings are embedded within the tyre tread so that the ruggedised housings are substantially flush with the surface of the tyre tread, although they could be located anywhere at or near the tyre surface as long as adequate data could be obtained for the type of wheel used, the type of surface and the information required. Whilst four accelerometers 2 are shown any number may be provided depending upon the measurement interval required and number of nearby wheels to widen the definition of the deformation away from the loaded wheel. An alternative configuration may be to have the loaded wheel(s) not instrumented, with all measurements taken only from a nearby wheel(s) which has only nominal loading but using the same principle.

While the accelerometers may be used alone, the stationary cycloid interval also allows enhanced analysis because pavement surface texture can also be measured using the same principle, measuring the degree of sealing achieved, when a fluid is injected centrally to the footprint of a tyre, as explained below. Correction of accelerometer results for the "seating effects" of texture increases the accuracy of the structural parameters determined but also allows a new method of determining estimates of texture and hence skid resistance, which are traditional parameters collected with other high-speed vehicles which measure pavement surface properties. However, adopting the stationary cycloid principle allows substantial cost savings by collecting all properties with a single vehicle, and if air is used (after appropriate calibration) rather than water (as traditionally used for skid resistance measurement) there are further savings in the operational time and logistics through avoidance of stops for water re-filling of the traditional tankers.

To include measurement of pavement surface texture and hence skid resistance, air (or other fluid) can be continuously supplied under pressure (readily achieved using the established central tyre inflation system) to the tyre. A fine tube allows a limited flow of fluid to escape from the pressurising system through an appropriately small hole to a disc shaped cavity recessed into about the middle third of the tyre tread. Just beyond the cavity the usual tyre grooves are filled to provide an annulus of smooth rubber, flush with the tread, to promote a partial seal when in contact with the pavement during the stationary cycloidal interval. The escaping fluid may be instrumented with a rapid response pressure sensor thus providing a measure of the effectiveness of the seal during each stationary interval, allowing correlation with the traditional measurement of pavement surface texture and skid resistance. As the wheel 1 rotates along surface 3 each accelerometer reaches a stationary period in cycloid movement (as per the accelerometer numbered 2 in FIG. 2). At this point data from the accelerometer 2 may be utilised to determine surface movement as will be explained below. Either one, but usually two or more sets of wheels may be instrumented, including sensors on axles with single wheels and also on axles with dual wheel configuration, with readings taken usually in each wheel track but on some occasions the vehicle may be offset laterally so that readings can be taken between wheel tracks to compare parts of the road that have not been trafficked with other parts that have.

Figure 2A:
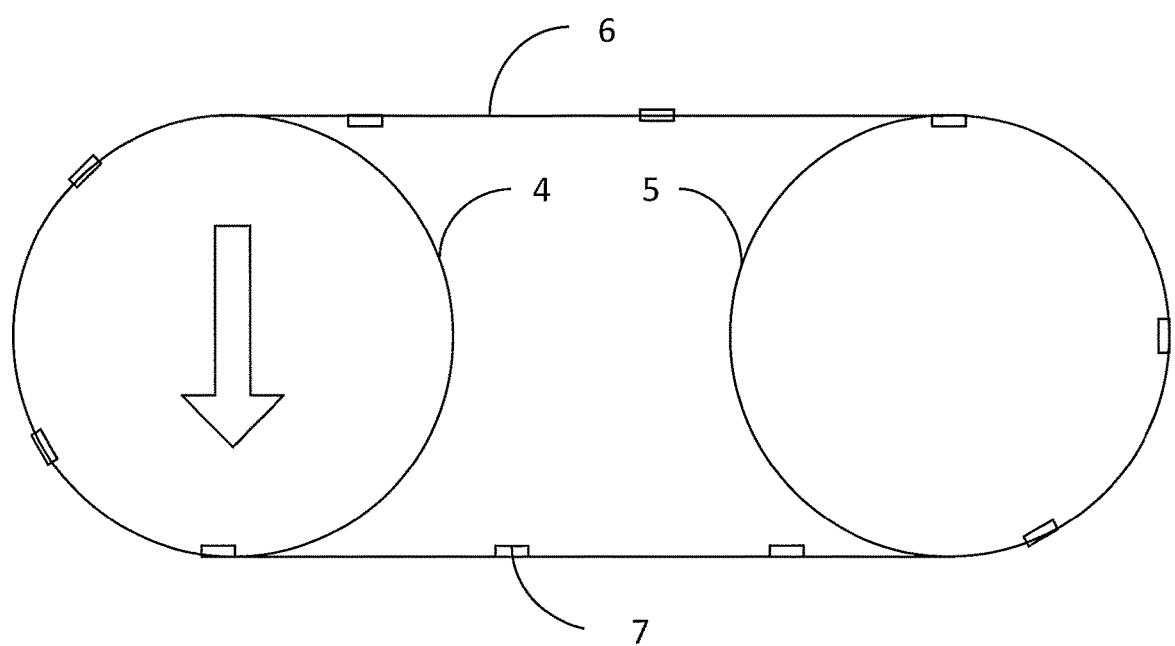
FIG. 2A shows a track driven arrangement in which a plurality of accelerometers are provided along a track driven around two wheels.

In an alternate embodiment shown in FIG. 2A a belt in the form of track 6 rotates about wheels 4 and 5. A number of accelerometers 7 are provided at intervals along belt 6. As in the previous embodiment point data from each accelerometer 7 may be utilised to determine surface deflection when it is directly below one of the wheels.

Figure 3:
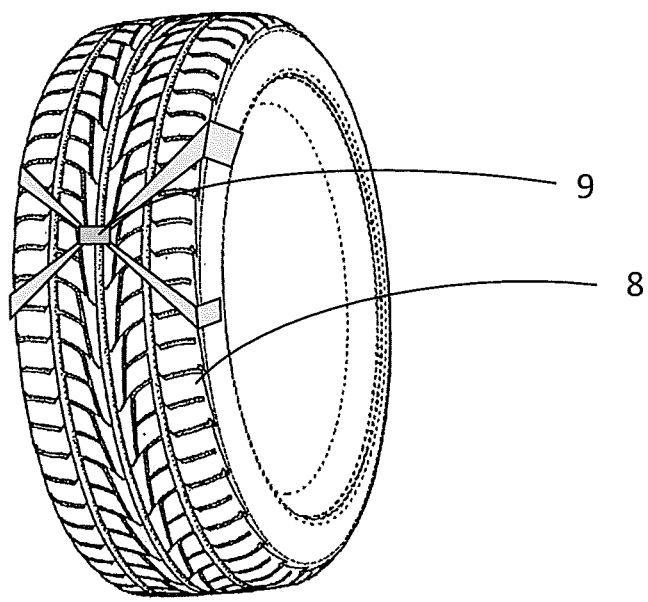
FIG. 3 shows an accelerometer mounted within a mesh secured to a wheel.

FIG. 3 shows a further embodiment in which one or more accelerometer 9 may be provided on a mesh 8 fitted to a standard vehicle wheel. The mesh 8 may be of the type typically fitted to wheels to provide increased grip, such as snow chains. This approach has the advantage that a relatively inexpensive device may be fitted to a standard vehicle tyre to provide very useful measures of pavement deformation.

Figure 4:
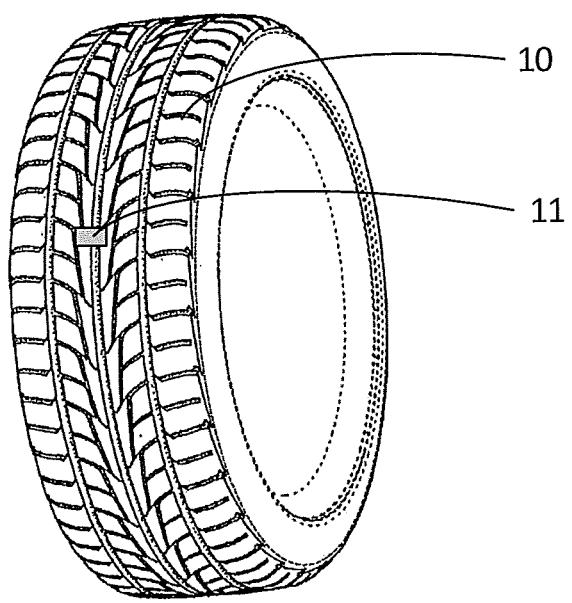
FIG. 4 shows an accelerometer embedded within the tread of a wheel.

FIG. 4 shows a conventional tyre 10 having an accelerometer 11 embedded in the tread so that it is flush with the tyre tread.

Figure 5:
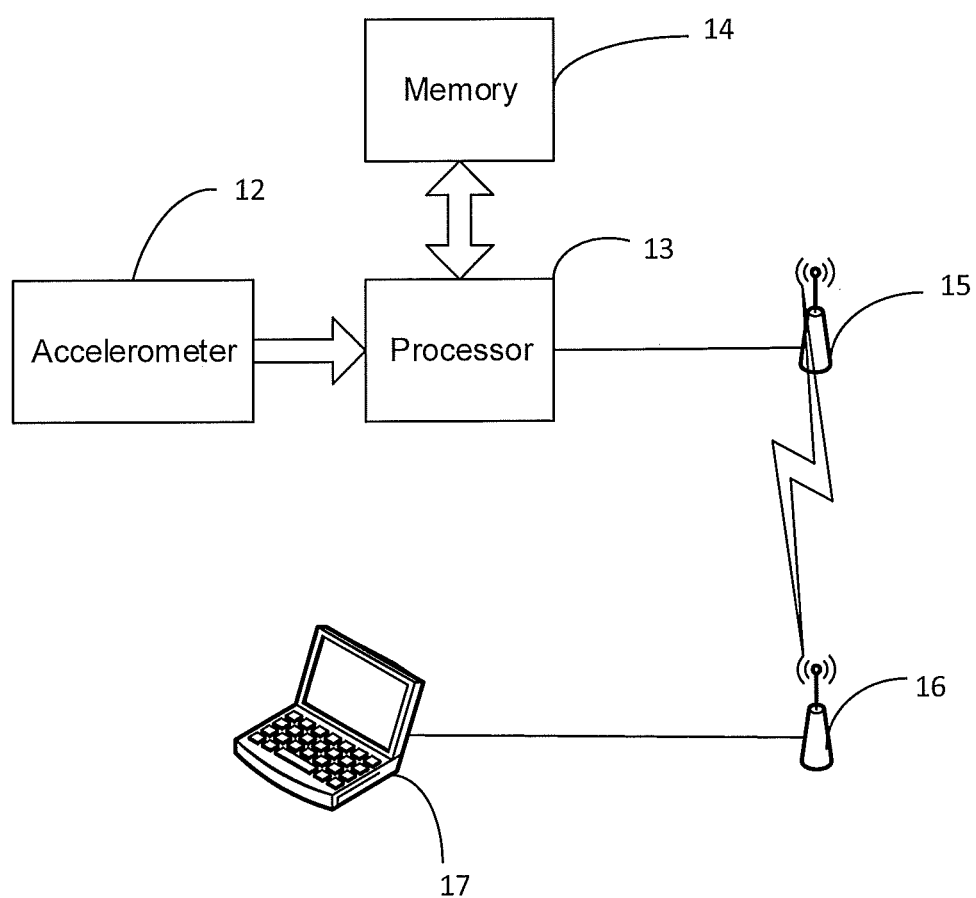
FIG. 5 shows a schematic diagram of a system for measuring the deformation of a surface.

FIG. 5 shows a block diagram of a system for acquiring and processing information from an accelerometer. A ruggedised case may contain an accelerometer 12, processor 13, memory 14 and transmitter 15. Data from accelerometer 12 that is supplied to processor 13 may be stored in memory and/or transmitted via wireless transmitter 15. In a basic implementation transmitter 15 may be omitted and memory 14 may be a removable memory card that may be removed from the ruggedised casing after measuring and be inserted into a computer for processing. Where wireless transmitter 15 is employed memory 14 could be omitted with all data being transmitted to receiver 16 and stored by computer 17. Other communication channels such as wired or optical links may also be employed. Accelerometers may typically be sampled at a rate of about 1-10 kHz over acceleration ranges of usually 1 to 20 g.

Employing multiple accelerometers to measure the pavement acceleration under multiple different load configurations (narrow versus wide treads, single versus dual tyres, low versus high loads/horizontal speeds) may be used to provide test data which may be used with correlations to determine the various traditional parameters for structural design or asset management. Acceleration measurements may be used to correlate against well recognised pavement structural design parameters such as standard central deflection under Falling Weight Deflectometer (FWD), curvature function, surface curvature index, or other offset deflections and parameters from the FWD, Benkelman Beam, Deflectograph, Rolling Wheel Deflectometer or Traffic Speed Deflectometer and similar traditional devices for measuring pavement structural capacity and remaining life. This allows generation of the critical strain parameters that can be applied to predict bearing capacity, rutting progression and roughness progression characteristics of pavements. This approach enhances the value of pavement testing while at the same time allowing for testing systems having fast moving wheel loads. The collected data can be used to determine vertical compressive strain, shear strain and horizontal tensile strain, which can be more valuable for the prediction of remaining life time and recommendations for repair and maintenance.

Figure 6:
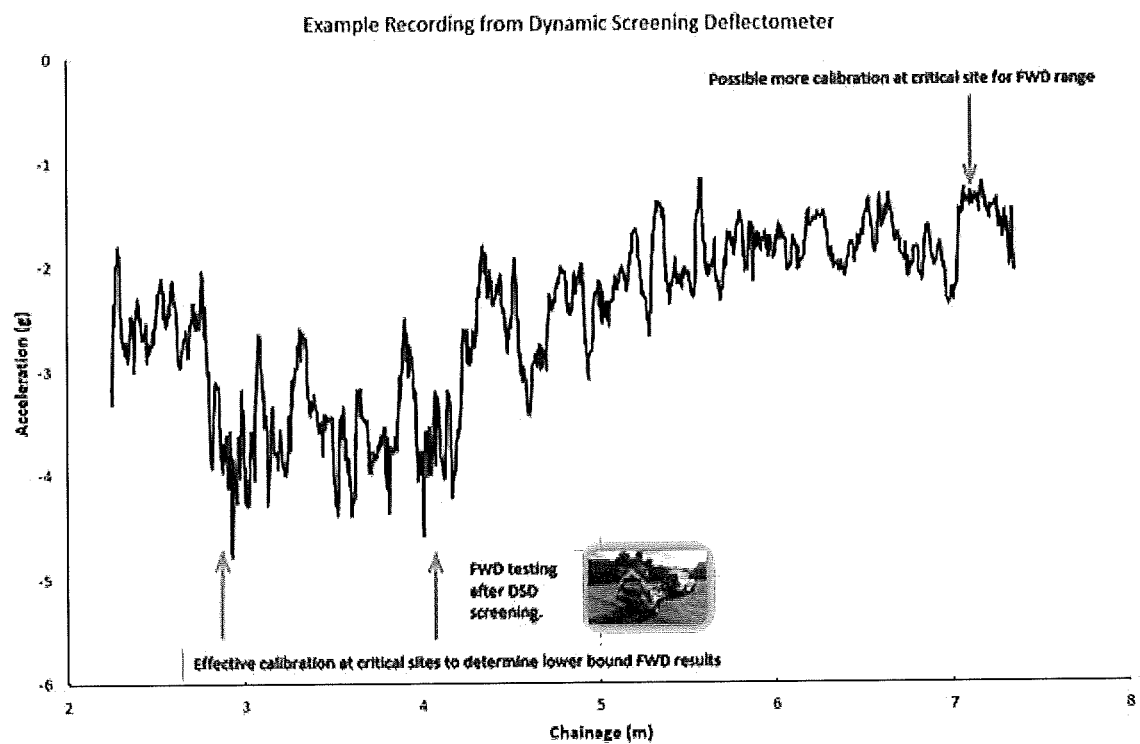
FIG. 6 shows a sample recording from an accelerometer embedded in a wheel.

FIG. 6 shows a recording from an accelerometer embedded in a wheel of a fully loaded vehicle on a 5 km run with accelerations logged at 1 m intervals at an approximately constant speed of 70 km/hr. The lower shaded zone (g<3.5) indicates pavement with strong accelerations and hence limited life. This information may be used directly or as the basis for directing traditional (FWD) tests to be performed. In this case FWD tests would be done just around the low points (here the 3 to 4 kilometre chainage), or for fuller calibration some would be done at the peaks, ie around chainage 7.0-7.2 km also.

Even if traditional FWD testing is performed in highlighted areas all necessary data may be collected for less than half the cost of using the traditional FWD device along the full length of the screening survey. In addition there is a continuous output of structural condition at 1 metre intervals which has the advantage of accurately determining the start and end of proposed rehabilitation sections or maintenance patches.

An important advantage of the present invention is that it can measure (at any speed) the pavement response at the point of maximum deformation in the centre of a continuously loaded area immediately beneath the load. None of the prior art devices for measurement of deformation at highway speed, does this. Other fast moving equipment (TSD and RWD) measure the movement between a pair of dual wheels, where there is locally no load on the pavement surface, so the deformation at the most heavily loaded point has to be inferred rather than measured.

Figure 7:
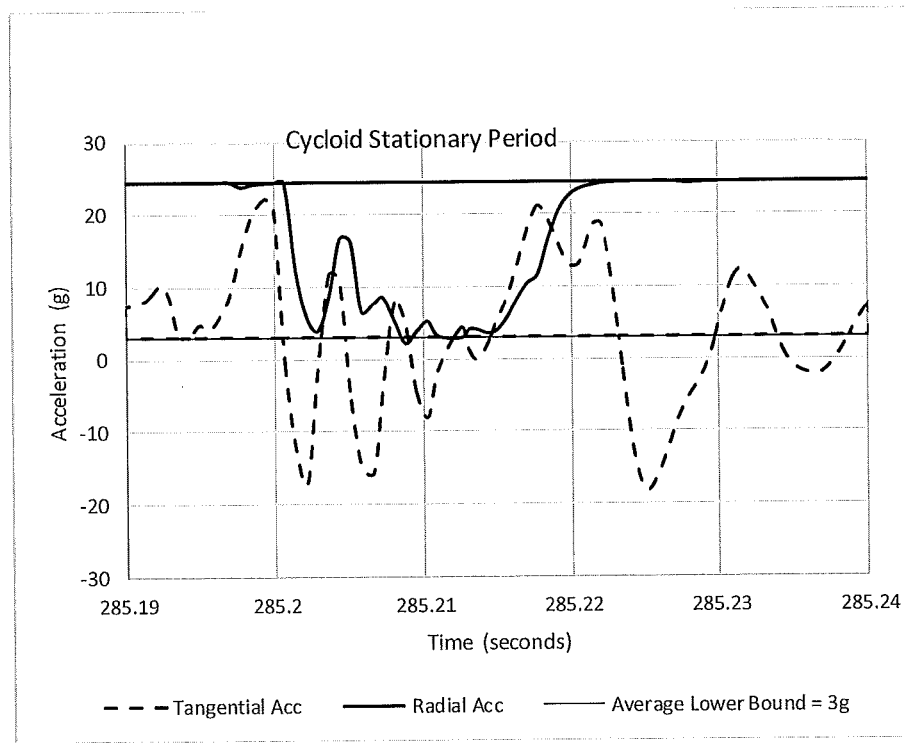
FIG. 7 shows a high speed event.

In FIG. 7 carried out at high speed, the solid line depicts the acceleration in the radial direction versus time, while the dashed line depicts the acceleration in the circumferential direction, showing the noise that may develop from natural frequencies which affect the signal. In these cases software is used to extract key elements of the system (eg solid line section) which are found by examination of both DSD and FWD records (or other traditional device) in the same interval of pavement, to be "signatures" characteristic of structural parameters. The interpretation becomes simpler when speed is reduced, but the signal may be filtered and averaged so that that reliable data can be collected at any speed, because the goal is to ensure the measuring equipment does not impede normal traffic flow (an increasing safety concern with FWD, Curviametre and Deflectograph). Software may be used to define the start and end of events (using both radial and circumferential sensors), to average the accelerations and their trends or this may be performed manually. Software can also be used to help refine TSD deflection bowls because the velocity measured by the TSD immediately between the wheels is zero or very small, therefore it has low reliability. On the other hand, the acceleration at that point is large so the DSD results can be used to obtain more reliable estimates of the central part of the deflection bowl shape when it is integrated from a combination of the TSD and DSD data.

Example Sequence of Implementation
1. Fix the accelerometer(s) securely inside a robust box (sensor housing).
2. Fix the sensor housing(s) at or near the perimeter of each wheel, in a manner that will allow the sensor housing to be flush with the tread around the wheel so that there will be no impact loading on the housing.
3. Load the axle(s) that incorporates the wheel(s) to the desired weight, being ideally the maximum axle loading planned for the pavement, with that tyre configuration and pressure.
4. Roll the wheel over a pressure pad to confirm the pressure on the housing is the same as the pressure on the surrounding tread (or record any difference).
5. Start the logger(s) to record at the appropriate frequency (commonly between 1 to 10 kHz). A micrologger using a microSD card in or near the sensor housing may be adopted, or bluetooth to a laptop computer in the vehicle if real-time monitoring is required.
6. Roll the wheel at creep speed (<1 km/hr) and carry out calibration checks.
7. Traverse the wheel at the required speed(s) over the test interval(s) required.
8. Repeat the creep speed calibration at the end of each traverse to confirm no shift in calibration.
9. Download the acceleration file, filter and report key parameters (such as accelerations) for each event.
10. Use the results to screen for areas of acceleration maxima and test these with traditional equipment (eg FWD or similar purpose device) for maximum accuracy, and use the accelerations to extrapolate or interpolate the localised FWD results to the full test interval.

For some network surveys the screening survey may be used alone, where good historic correlations with FWD or similar devices are available.

Signal Processing

Figure 8A:
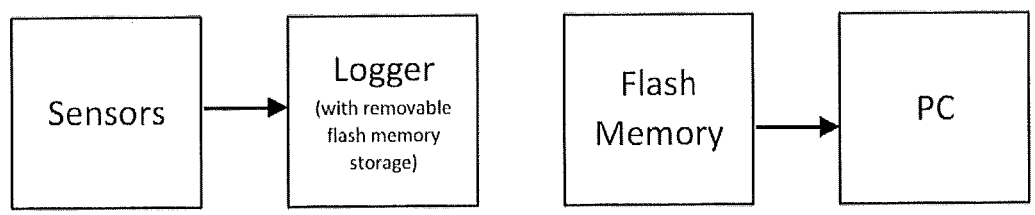
FIGS. 8A to 8C show methods for communication of data between the sensor(s) and a computer.
Figure 8B:
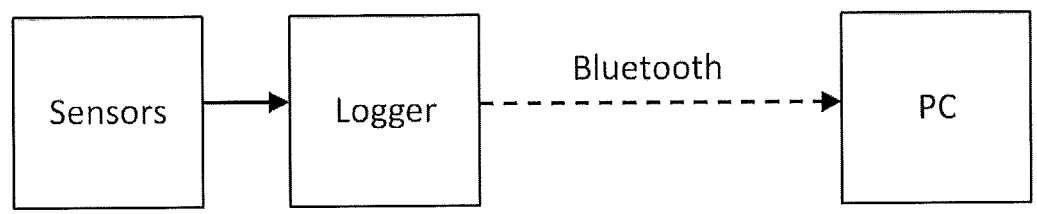
Figure 8C:
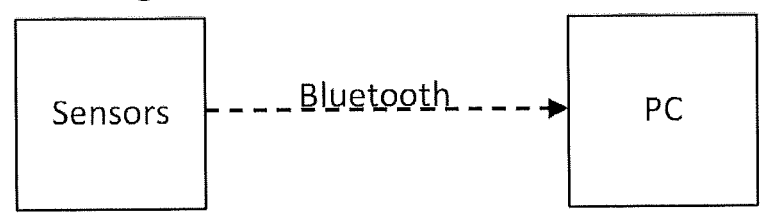

Data may be communicated from the sensor(s) to a processor, computing device or PC of any suitable kind by any suitable communications method, including one of those shown in FIGS. 8A to 8C.

In FIG. 8B, the logger carries out high frequency sampling (usually 1 to 10 kHz) of accelerations and forces, logging them to memory, and sending them via Bluetooth to a laptop computer. Once the raw data is available on the PC, the data is processed using software. The initial signal is filtered by picking "events" (stationary cycloid period). Data is stored for each event, including for representative intervals within each event, and for each axis, vertical acceleration, horizontal acceleration, linear velocity, angular velocity, deformation and change in direction. As well as or "signature acceleration" pattern over specified intervals.

Acceleration measurements are used to correlate against well recognised pavement structural design parameters such as standard central deflection under Falling Weight Deflectometer (FWD), curvature function, surface curvature index, or other offset deflections and parameters from the FWD, Benkelman Beam, Deflectograph or Traffic Speed Deflectometer and similar traditional devices for measuring pavement structural capacity and remaining life.

For rapid turnaround of testing results, the median acceleration ($a_m$) measured in units of the gravitational constant, g (=9.81 m/s/s) taken over a distance of 100 mm centred on the mid point of the cycloid stationary period is related to the widely used standard 40 kN Benkelman Beam deflection (d0) (or FWD central deflection). The relationship is given approximately by:

$$d0(mm) = ka_m$$

Where k is a constant for a given testing speed and loaded tyre size, (k=0.3 for a speed of 50 km/hr with the accelerometer placed centrally on the perimeter of a 35 kN large single tyre such as 385 65R 22.5 inflated to 700 kPa). The advantage of this form of high level quantification at high speed and low cost and is that a kilometre of pavement can be tested and reported in about 2 minutes, allowing immediate decisions on the structural capacity of the pavement.

Figure 9:
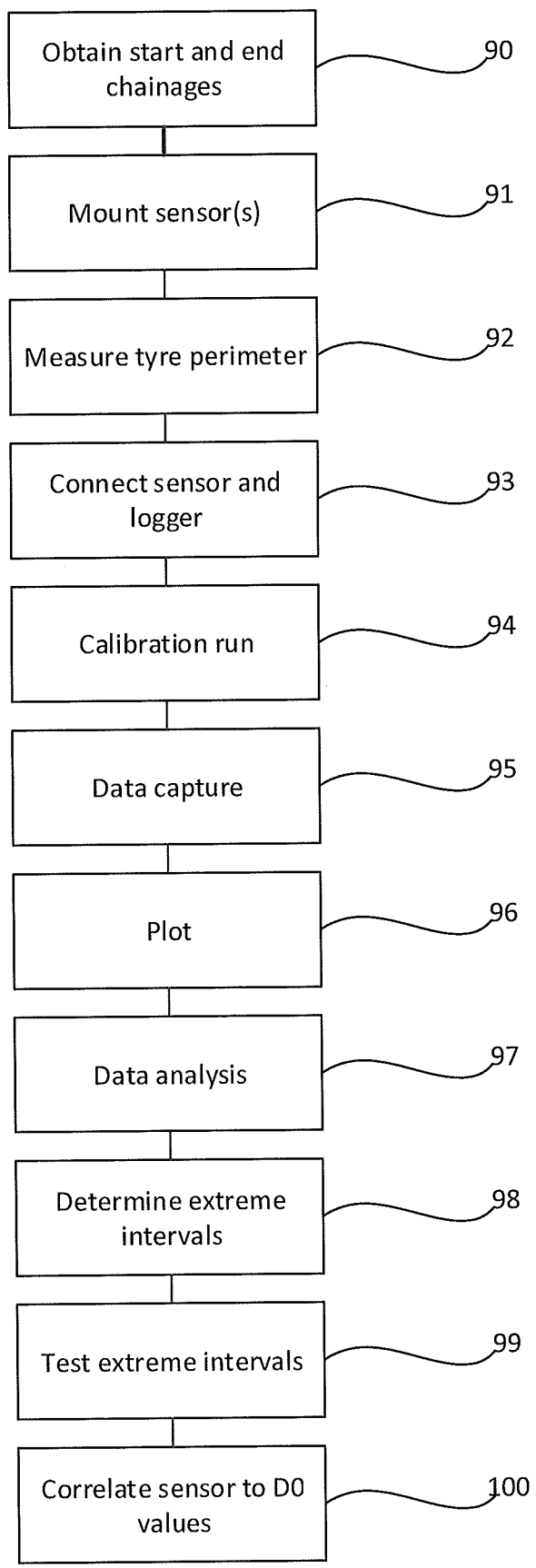
FIG. 9 is a flow chart illustrating one embodiment of measurement method.

One embodiment of measurement method will now be described with reference to FIG. 9.

At block 90, start and end chainages for the road interval to be tested are obtained. These may be input manually by a user, or may be obtained automatically using a GPS device. In either case the start and end chainages may be associated with GPS coordinates.

At block 91, one or more sensors are mounted at or near the perimeter of the tyre. The sensors may be mounted in any suitable rigid housing. The housings may be mounted in the tyre such that the rigid housing fits flush with the tyre surface and is firmly pressed against the road surface as the tyre rotates.

At block 92, the perimeter of the tyre is measured in its usual state of inflation.

At block 93, the sensor is connected to a logger programmed for recording the radial acceleration. The sensor and logger may be arranged to record radial acceleration over a range of at least 0-10 g at 1-10 kHz sampling. Other sensors may be used for refined readings but measurement of the radial acceleration is the primary requirement.

At block 94, a calibration run is performed. The sensor and logger are actuated, such that acceleration data and concurrent GPS position data is captured. The testing vehicle is driven at creep speed (<1 km/hr). The captured data is assessed to check that the accelerometer does record smoothly between 1 g, and −1 g as the sensor rotates between the bottom and top of the tyre. (Any differences from these values may be used in post-calibration, but most accelerometers are sufficiently accurate to require no further calibration.)

At block 95 a data capture run is performed. The testing vehicle is run at typical but relatively constant speed for the road environment between the start and finish chainages.

At block 96 the radial acceleration may be plotted versus time and/or versus distance using the GPS information. Much of the plot may be in saturation for the sensor (i.e. the acceleration may be greater than the maximum measurable acceleration for the sensor), but in the relevant periods the acceleration will be usually between 1 and 5 g.

Figure 10:
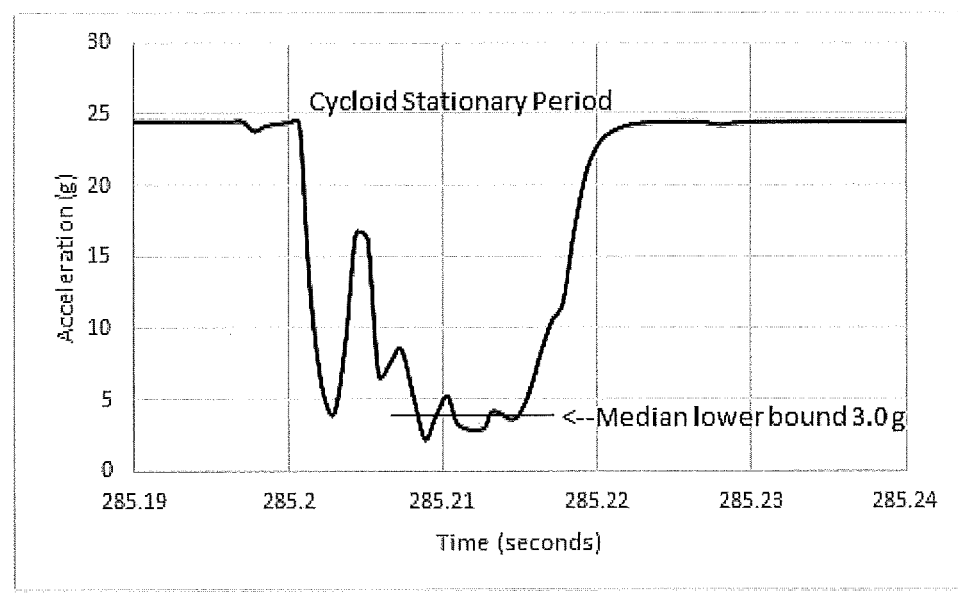
FIG. 10 shows a plot of acceleration versus time.

At block 97, stationary cycloid periods may be identified in the recorded data, smoothing vibrations or averaging over short lengths to identify the characteristic minimum acceleration, as shown in FIG. 10, which shows an example plot of acceleration versus time. The flat region around 25 g represents the saturation value for the sensor. The region at lower accelerations (between about 285.20 and 285.22 seconds contains data captured at or around the cycloid stationary period. In the embodiment of FIG. 10, the characteristic minimum acceleration is identified as about 3.0 g, and this may be identified graphically or by any suitable automated method for identifying the minimum acceleration. The minimum acceleration may be identified as a median lower bound. Process may be performed graphically from time to time to ensure no anomalies are present, but conventional smoothing using software for filtering or determining running means may be used for production runs.

At block 98, by analysis of the characteristic accelerations versus distance, a number of positions on the road (preferably two or more) may be determined where extremes are evident. These will reflect the stiffest and weakest intervals of pavement.

At block 99 the determined extreme intervals may be tested with any conventional pavement testing device to find the characteristic D0 value. For example, a Benkelman Beam, which records the transient surface deflection as a truck with dual wheels loaded to 40 kN travels over a given point, may be used. Alternatively a Falling Weight Deflectometer which applies a load of about 40 kN to a 300 mm circular plate, or any other suitable device, may be used.

D0 is the central deflection of the pavement under a 4.2 tonne (40 kN) dual wheel (or 300 mm load plate). Typical values of D0 are 0.3 mm for a heavy duty pavement, 0.9 mm for a moderately trafficked road or 1.5 mm for a lightly trafficked road. Other parameters which may be measured are the surface curvature index or the remaining life of the pavement, from standard correlations.

At block 100, the sensor may be correlated to the D0 values (or other preferred measure) for the road under consideration (checking for sensibility using data from previous projects). Typical values are about 1.5 g, 3 g or 5 g for D0 values of 0.5, 1 and 1.5 mm when the testing speed is 50-70 km/hr, ie D0 (mm)=k*Radial Acceleration, where k is often about 0.3, and acceleration is in units of the gravitational constant g (9.81 m/s/s). A more refined calibration may include speed.

Using the calibration, report the equivalent D0 deflection value versus chainage along the road. (And/or report the equivalent curvature and/or remaining life correlations and/or other parameter if preferred.)

By using different wheel configurations (diameter, width, material hardness, inflation pressure, single versus dual wheels) the loaded area is changed, and the different motions from variously located sensors on the tread then allow back analysis of the likely pavement structure. This is a result of the inevitable load spreading effect of pavement layers which results in the ratio of strains in the upper layer to the strains in the subgrade increasing as the loaded area is concentrated to a smaller footprint, while applying the same total load.

The widely known process of integration may be used to convert accelerations from multiple points to velocity and then to displacement, thus enabling conventional multi-layer elastic theory (used as the basis for FWD interpretation) to be used for back-analysis. Explanations of both empirical and analytical methods of analysing FWD deflections are detailed widely, including in the following link: http://www.pavementinteractive.org/article/deflection-based-non-destructive-pavement-analyses/

Other systematic interpretation comprises methodical determination of characteristic signatures from individual forms of pavement with known profiles and layer properties, using repeated observations, preferably using FWD measurements on the same intervals of pavement for correlation with the most accurate form of testing currently available A largely observational approach can also be used, by testing an interval of pavement that has experienced known intensity of traffic, but exhibits varying severity of distress (from incipient to terminal). The observational method is then used to assign the limiting accelerations that relate to each incremental level of distress severity. (Signatures from other parameters after integration or differentiation, including jolt (rate of change of acceleration with time) can all show varying degrees of correlation with structural distress, depending on the composition of the various pavement layers.)

No other device known to the Applicant uses the stationary cycloid period for measuring acceleration at or near the point of maximum loading (immediately beneath a tyre contact area), and is capable of measuring accelerations effectively over such a wide range of vehicle speeds. The method and system is simple and convenient, allowing measurements to be performed at normal driving speeds and having much lower capital and operating costs that all other traditional devices. The data obtained may also be quickly analysed and available to users within a few minutes of testing, much sooner than any other high speed device, (for which customary delivery times are many weeks). This is because a large amount of test data can be generated, that relates simply to one of the most widely recognised test concepts in pavement engineering (standard deflection under a 40 kN wheel load).

While the stationary cycloid principle may be used alone, it offers major increases in sensitivity to Doppler layer TSD operation also because these lasers use measurement of pavement velocity away from the centre of the loaded wheels, because velocity is essentially zero at the mid point of the deflection bowl. However, pavement vertical acceleration values are at their peak beneath the centre of the load and are comparatively huge (often 2 to 10 times as great as gravity, as that is clearly the point that the load finishes its loading phase and initiates its unloading phase. Therefore the signal to noise ratio is high and it provides a key data point on the pavement deformation bowl that is omitted with traditional TSD devices at present. The result of the combination is more accurate definition of the entire bowl. Other major advantages in combining the invention with TSD technology is that it will extend the TSD capability to both higher or lower speeds than its currently limited range, enable testing in wet conditions as well as dry, on unsurfaced roads as well as sealed, on corners as well as straights. All of the latter are limitations with existing highway speed devices (TSD and RWD).

As well as in combination with Doppler lasers, the invention may also be used in combination with other developing technologies that use either distance or velocity measurements including RWD and stereo imaging. When dual wheels are instrumented and used in combination with a conventional Benkelman Beam the comparison enables a very simple calibration and assurance test that is widely recognised and understood throughout the industry.

Embodiments of the invention are described herein with reference to schematic view illustrations. As such, the actual dimensions of the elements of the present invention may vary depending on the particular arrangement of the invention as well as the manufacturing techniques employed. Embodiments of the invention should not be construed as limited to the particular shapes or sizes of the elements illustrated herein but are to include deviations. Thus, the elements illustrated in the figures are schematic in nature and their shapes are not intended to illustrate the precise shape of an element and are not intended to limit the scope of the invention. The present invention is described herein with reference to certain embodiments, but it is understood that the invention can be embodied in many different forms and should not be construed as limited to the embodiments set forth herein. In particular many different sensor and wheel load arrangements can be provided beyond those described above, and many different sensors, sensor housings, loads, pressures can be used depending on whether the purpose is for construction quality assurance, pavement life determination, asset management or rehabilitation design. The texture of the pavement also affects the form of housing for the sensor (steel, plastic etc) and degree of calibration for each operating speed. Many alterations and modifications may be made by those having ordinary skill in the art, given the benefit of the present disclosure, without departing from the spirit and scope of the inventive subject matter. Therefore, it must be understood that the illustrated embodiments have been set forth only for the purposes of example, and that it should not be taken as limiting the inventive subject matter as defined by the following claims. Therefore, the spirit and scope of the invention should not be limited to the versions described above.

The invention claimed is:

1. A method of measuring deformation of a surface comprising:
   a. providing an accelerometer at or near the periphery of a rolling weight, the accelerometer positioned to revolve with the rolling weight;
   b. rolling the rolling weight over the surface to deform the surface;
   c. analyzing one or more signals developed by the accelerometer during a stationary cycloidal period of the accelerometer in which centrifugal forces on the accelerometer are reduced and a signal developed by the accelerometer in response to the deformation of the surface is enhanced; and
   d. developing a measure of the deformation of the surface based on the one or more signals.

2. The method claim 1 wherein:
the accelerometer is positioned to measure deformation directly beneath the rolling weight;
the measure of the deformation of the surface is a measure of deformation of the surface directly beneath the rolling weight.

3. A method as claimed in claim 1 employing a track passing about two or more wheels including one or more accelerometer in the track arranged so that measurements are obtained from the accelerometer when a wheel is above an accelerometer in the track.

4. A method as claimed in claim 1 wherein each accelerometer is enclosed in a ruggedised housing.

5. A method as claimed in claim 1 wherein each accelerometer is embedded in a tire tread generally with the tire surface.

6. A method as claimed in claim 1 wherein the accelerometer is embedded in a belt or mesh secured to the rolling weight.

7. A method as claimed claim 1 wherein a plurality of accelerometers are provided about the periphery of a rolling weight.

8. A method as claimed in claim 7 wherein the accelerometers are evenly spaced.

9. A method as claimed in claim 1 including a plurality of wheels in which different wheel configurations are employed in terms of one or more of: wheel tracking, wheel offset, wheel loading, wheel stiffness and wheel tire pressure.

10. A method as claimed in claim 1 wherein each accelerometer includes a data logger.

11. A method as claimed in claim 1 wherein each accelerometer or IMU includes a wireless transmitter.

12. A method as claimed claim 1 wherein each accelerometer includes a transmitter for transmitting information from each accelerometer or IMU that is mounted on the rolling weight away from the periphery of the rolling weight.

13. A method of measuring deformation of a surface comprising:
   a. providing an inertial measurement unit (IMU) at or near the periphery of a rolling weight, the IIMU positioned to revolve with the rolling weight;
   b. rolling the rolling weight over the surface to deform the surface;
   c. analyzing one or more signals developed by the IMU during a stationary cycloidal period of the IIMU in which centrifugal forces on the IMU are reduced and a signal developed by the IMU in response to the deformation of the surface is enhanced; and
   d. developing a measure of the deformation of the surface based on the one or more signals.

14. A method as claimed in claim 13 wherein the IMU includes one or more accelerometer and one or more gyroscope.

15. A method as claimed in claim 14 wherein the IMU includes three accelerometers with their axes of measurement orthogonal to one another.

16. A method as claimed in claim 14 wherein the IMU includes three gyroscopes with their axes of measurement orthogonal to one another.

17. A method as claimed in claim 14 wherein the IMU includes one or more magnetometers.

18. A method as claimed in claim 17 wherein the IMU includes three magnetometers with their axes of measurement orthogonal to one another.

19. A method as claimed in claim 13 wherein the rolling weight is a wheel.

20. A method as claimed in claim 19 wherein the wheel is a loaded wheel.

21. A method as claimed in claim 20 wherein a plurality of wheels are employed.

22. A method as claimed in claim 21 wherein two or more wheels are offset and each include an accelerometer at or near the periphery of each wheel.

23. A method as claimed in claim 21 including a loaded wheel and a wheel having a lesser loading offset from the loaded wheel having an accelerometer at or near its periphery.

24. A method as claimed in claim 13 wherein tire stiffness or pressure is adjusted to vary the effective loaded area of a rolling weight.

\* \* \* \* \*